US012183532B2

(12) United States Patent
Osada et al.

(10) Patent No.: US 12,183,532 B2
(45) Date of Patent: Dec. 31, 2024

(54) FUSE AND METHOD FOR MANUFACTURING FUSE

(71) Applicant: Pacific Engineering Corporation, Gifu (JP)

(72) Inventors: Kenji Osada, Gifu (JP); Shuya Kataoka, Gifu (JP)

(73) Assignee: Pacific Engineering Corporation, Gifu (JP)

( * ) Notice: Subject to any disclaimer, the term of this patent is extended or adjusted under 35 U.S.C. 154(b) by 57 days.

(21) Appl. No.: 18/009,982

(22) PCT Filed: Jun. 10, 2021

(86) PCT No.: PCT/JP2021/022037

§ 371 (c)(1),
(2) Date: Dec. 12, 2022

(87) PCT Pub. No.: WO2022/014212

PCT Pub. Date: Jan. 20, 2022

(65) Prior Publication Data

US 2023/0230792 A1 Jul. 20, 2023

(30) Foreign Application Priority Data

Jul. 17, 2020 (JP) ................................ 2020-122710

(51) Int. Cl.
*H01H 85/175* (2006.01)
*H01H 69/02* (2006.01)
(Continued)

(52) U.S. Cl.
CPC ............ *H01H 85/48* (2013.01); *H01H 69/02* (2013.01); *H01H 85/12* (2013.01); *H01H 85/175* (2013.01)

(58) Field of Classification Search
CPC .... H01H 85/143; H01H 85/157; H01H 85/48; H01H 69/02; H01H 85/12; H01H 85/175
See application file for complete search history.

(56) References Cited

U.S. PATENT DOCUMENTS 3,378,659 A * 4/1968 Hitchcock ............ H01H 85/157 337/234
5,296,832 A * 3/1994 Perreault .............. H01H 85/153 337/201

(Continued)

FOREIGN PATENT DOCUMENTS

JP 2017-4634 1/2017
JP 2018-26202 2/2018

(Continued)

OTHER PUBLICATIONS

Office Action dated Feb. 21, 2023, in Korea Patent Application No. 10-2022-7016908, 5 pages.

(Continued)

*Primary Examiner* — Jacob R Crum
(74) *Attorney, Agent, or Firm* — Lowe Graham Jones PLLC

(57) ABSTRACT

Therefore, the invention of the present application provides a fuse in which a position and a posture of a fuse element are easily stabilized and which is easily assembled, and a method for manufacturing the fuse. A fuse including a fuse element having a fusing portion; and a casing accommodating the fusing portion; where the fuse element has a long shape extending in a longitudinal direction of the casing and at least two or more fuse elements are provided; the fuse element has one end portion side coupled to each other by a coupling portion; a first holding portion that holds the fuse element is provided in one opening of the casing; and a (Continued)

locking portion that locks the coupling portion of the fuse element is provided in the first holding portion.

9 Claims, 9 Drawing Sheets

(51) Int. Cl.
*H01H 85/12* (2006.01)
*H01H 85/48* (2006.01)

(56) References Cited

U.S. PATENT DOCUMENTS

| | | | | |
|---|---|---|---|---|
| 2016/0141138 | A1* | 5/2016 | Schlaak | H01H 69/02 337/231 |
| 2018/0122606 | A1* | 5/2018 | Ando | H01H 85/143 |
| 2019/0096622 | A1* | 3/2019 | Lasini | H01H 85/143 |

FOREIGN PATENT DOCUMENTS

| | | |
|---|---|---|
| JP | 2018-129309 | 8/2018 |
| KR | 10-2018-0017451 | 2/2018 |

OTHER PUBLICATIONS

International Search Report (with English translation) and Written Opinion of the International Searching Authority, dated Aug. 17, 2021, in International Patent Application No. PCT/JP21/22037, 9 pages.

* cited by examiner

FUSE AND METHOD FOR MANUFACTURING FUSE

PRIORITY CLAIM

This application is a U.S. national phase of International Patent Application No. PCT/JP2021/022037 filed Jun. 10, 2021; which claims the benefit of priority from Japan Patent Application No. 2020-122710 filed Jul. 17, 2020, the contents of which are incorporated by reference.

FIELD OF THE INVENTION

The invention of the present application relates to a fuse mainly used for an automobile electric circuit or the like, and more particularly to a fuse that accommodates a fuse element in a casing, and a method for manufacturing the fuse.

BACKGROUND OF THE INVENTION

Conventionally, fuses have been used to protect an electric circuit mounted on an automobile or the like and various electrical components connected to the electric circuit. Specifically, when an unintended overcurrent flows in the electric circuit, a fusing portion of the fuse element incorporated in the fuse fuses due to heat generated by the overcurrent to protect so that an excessive current does not flow to various electrical components.

There are various types of fuses depending on the application, and for example, a fuse described in Patent Literature 1 for protecting from a relatively large overcurrent is known.

The fuse described in Patent Literature 1 is a type in which a fuse element extending in a long length direction of a tubular casing is accommodated in the casing. However, when a fuse is assembled by accommodating a plurality of fuse elements in a casing, a position and a posture of the fuse elements tend to be easily displaced in the casing as the fuse elements have a long shape.

CITATIONS LIST

Patent Literature

Patent Literature 1: Japanese Unexamined Patent No. 2018-26202

SUMMARY OF THE INVENTION

Technical Problems

Therefore, the invention of the present application provides a fuse in which a position and a posture of a fuse element are easily stabilized and which is easily assembled, and a method for manufacturing a fuse.

Solutions to Problems

In order to solve the above problems, a fuse according to the invention of the present application relates to a fuse including: a fuse element having a fusing portion; and a casing accommodating the fusing portion; where the fuse element has a long shape extending in a longitudinal direction of the casing and at least two or more fuse elements are provided; the fuse element has one end portion side coupled to each other by a coupling portion; a first holding portion that holds the fuse element is provided in one opening of the casing; and a locking portion that locks the coupling portion of the fuse element is provided in the first holding portion.

According to the above feature, in a state where the fuse element is accommodated in the casing, the coupling portion is locked to the locking portion of the first holding portion, so that the position and posture of each fuse element in the casing are less likely to displace and are stable. Therefore, when the fuse is assembled by attaching each component, the position and posture of each fuse element in the casing are stable, so that the fuse can be easily assembled.

Furthermore, in the fuse according to the invention of the present application, the first holding portion includes an insertion hole through which the fuse element is insertable into the casing, and the locking portion is located between the insertion holes.

According to the above feature, since the locking portion is locked to the coupling portion in a state of being sandwiched from both sides by the fuse elements on both sides inserted into the insertion hole, the substantially U-shaped portion can be locked to the locking portion by the fuse elements on both sides and the coupling portion, so that the position and posture of each fuse element in the casing are less likely to displace and are stable.

In the fuse according to the invention of the present application, a second holding portion that holds the fuse element is provided in the other opening of the casing, and the second holding portion includes a put-in hole into which the other end portion side of the fuse element is put in.

According to the above feature, since the other end portion of the fuse element is put into the put-in hole of the second holding portion, the position and posture of each fuse element in the casing are more unlikely to displace and are stable.

Furthermore, in the fuse according to the invention of the present application, each of the fuse elements is bent and formed from one flat metal plate, and the other end portion side of each of the fuse elements is directed in the same direction and each of the fuse elements is extended in the longitudinal direction of the casing by being bent at the coupling portion.

According to the above feature, the fuse is easily manufactured, the fuse elements have high electrical connectivity, and the fuse elements are easily inserted into the casing and assembled.

Further, a method for manufacturing the fuse according to the invention of the present application includes the steps of inserting the fuse element into the casing from a side of one opening of the casing in a state where the casing is laid in a substantially horizontal direction, locking a coupling portion of the fuse element to the locking portion of the first holding portion, and accommodating the fuse element in the casing.

According to the above feature, even in a state where the casing is laid in the substantially horizontal direction, the fuse can be assembled while stabilizing the position and posture of the fuse element in the casing, so that the method for manufacturing the fuse can be diversified, and convenience is improved.

Advantageous Effects of Invention

As described above, according to the fuse and the method for manufacturing a fuse of the invention of the present application, the position and posture of the fuse element are easily stabilized, and assembly is facilitated.

BRIEF DESCRIPTION OF THE DRAWINGS

Preferred and alternative examples of the present invention are described in detail below with reference to the following drawings.

DETAILED DESCRIPTION OF THE PREFERRED EMBODIMENT

Reference Signs List

Figures 1A, 1B, 1C:
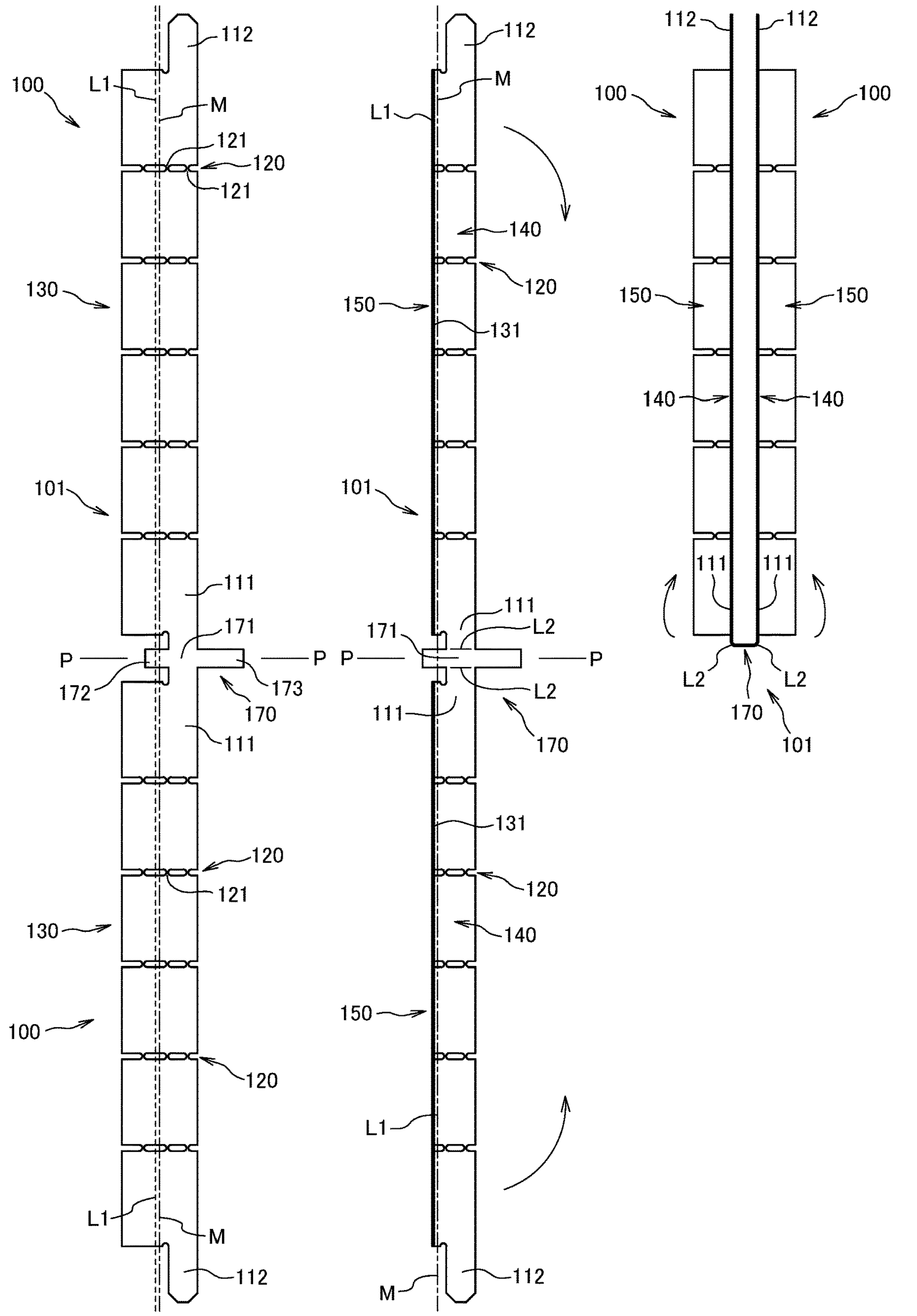
FIG. 1(*a*) is a plan view of a state in which a fuse element unit of a fuse according to a first embodiment of the invention of the present application is developed, FIG. 1(*b*) is a plan view of a state in which the fuse element unit is bent and molded, and FIG. 1(*c*) is a front view of a state in which the fuse element unit is bent and molded.

100 fuse element
111 end portion
120 fusing portion
170 coupling portion
200 casing
220 opening
300 first holding portion
320 locking portion
600 fuse Hereinafter, each embodiment of the invention of the present application will be described with reference to the drawings. The shape, material, and the like of each member of the fuse in the embodiment described below are merely examples, and are not limited thereto. The "longitudinal direction of the casing" described in the present specification is a direction parallel to an axis connecting end portions of both ends of the casing.

First Embodiment

Figure 2:
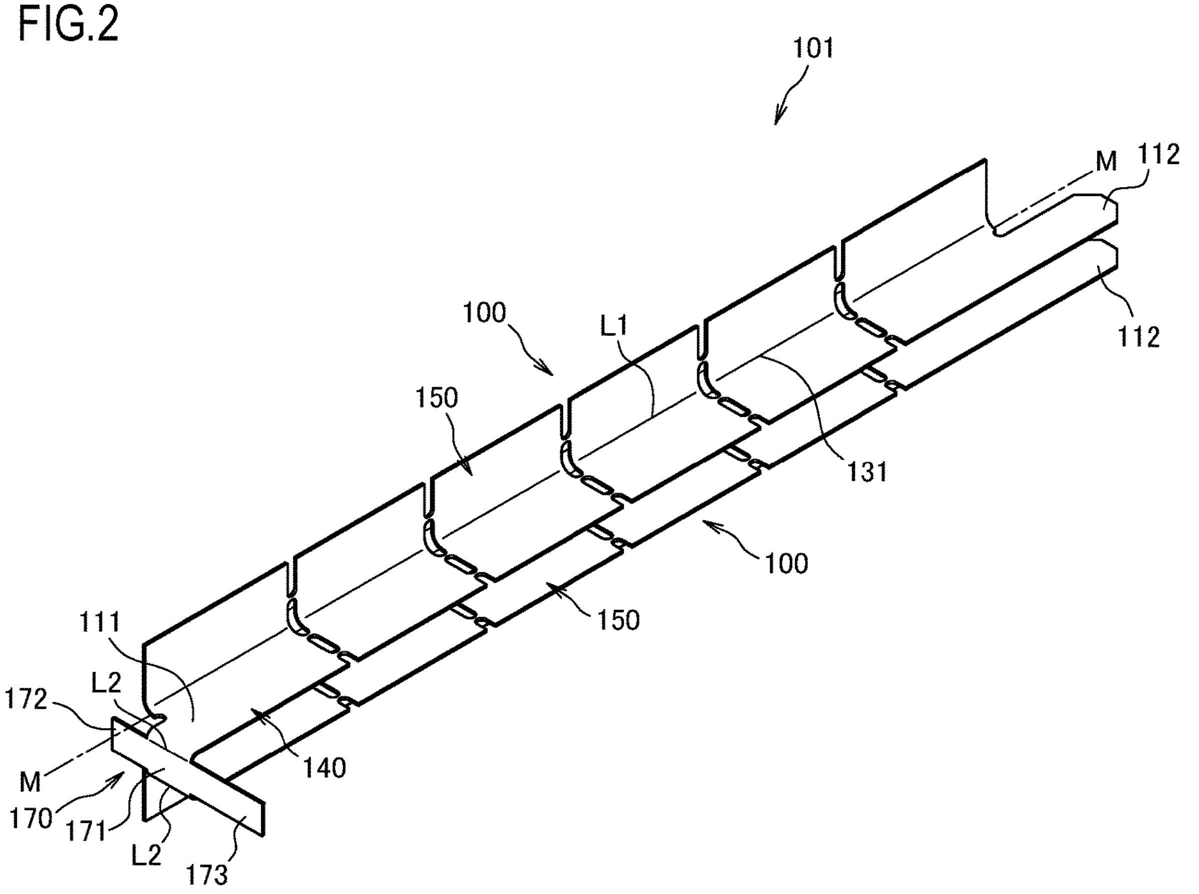
FIG. 2 is a perspective view of a bent and molded fuse element unit.

In FIGS. 1 and 2, manufacturing steps of a fuse element unit 101 of a fuse according to a first embodiment of the invention of the present application will be described. FIG. 1(*a*) is a plan view of a state in which the fuse element unit 101 is developed, FIG. 1(*b*) is a plan view of a state in which the fuse element unit 101 is bent and molded, and FIG. 1(*c*) is a front view of a state in which the fuse element unit 101 is bent and molded, and FIG. 2 is a perspective view of the bent and molded fuse element unit 101.

First, a flat plate material having a uniform thickness made of a conductive metal such as copper or an alloy thereof is punched into a shape as shown in FIG. 1(*a*) by a press machine or the like. One metal plate shaped into a predetermined shape as illustrated in FIG. 1(*a*) is provided with a pair of fuse elements 100 that are line symmetric to a center line P. Each fuse element 100 has a long shape in which one end portion 111 and the other end portion 112, an intermediate portion 130 between the end portion 111 and the end portion 112 on both sides, and a plurality of fusing portions 120 are formed. Specifically, the fusing portion 120 includes a plurality of linear fusing portions 121 whose widths are locally narrowed in the intermediate portion 130, and each of the fusing portions 121 generates heat and fuses to cut off an overcurrent when an unintended overcurrent flows in an electric circuit or the like. Note that the fusing portion 120 is not limited to being configured by the linear fusing portion 121 having a narrow width, and any configuration can be adopted, such as a configuration in which a small hole is provided in the intermediate portion 130 and a portion having a narrow width is formed as a fusing portion, or a configuration in which a metal material that can be easily fused is locally disposed in the intermediate portion 130, as long as an overcurrent can be cut off by generating heat and fusing when an unintended overcurrent flows in an electric circuit or the like.

One end portions 111 of the pair of fuse elements 100 are coupled to each other by a coupling portion 170. The coupling portion 170 has a flat plate shape, and includes a basal end portion 171 continuing with the end portion 111, an extending portion 172 extending from the basal end portion 171 toward one side, and an extending portion 173 extending from the basal end portion 171 toward the other side.

Next, as shown in FIGS. 1(*a*) and 1(*b*), the intermediate portion 130 is bent at a fold line L1 parallel to the long length direction M of the fuse element 100. The longitudinal direction M of the fuse element 100 is a direction parallel to an axis connecting the end portions 111 and 112 on both sides. Therefore, the fold line L1 is also parallel to the axis connecting the end portions 111 and 112 on both sides.

Then, the intermediate portion 130 includes a first flat surface 140 linearly extending along the long length direction M and a second flat surface 150 bent so as to rise from the first flat surface 140 and linearly extending along the long length direction M. The first flat surface 140 and the second flat surface 150 are continuous with each other at a bent portion 131 bent at the fold line L1, and the first flat surface 140 and the second flat surface 150 intersect each other at a substantially right angle. Then, a state in which the plurality of fusing portions 120 are provided on the first flat surface 140 and the second flat surface 150 is obtained.

Furthermore, as illustrated in FIGS. 1(*c*) and 2, the fuse element unit 101 is bent so as to rise approximately 90 degrees at a fold line L2. Then, the fuse elements 100 are brought proximate to each other to a parallel state. Then, the fuse element unit 101 including two fuse elements 100 in which the other end portions 112 side are directed in the same direction is completed. Each fuse element 100 extends in the longitudinal direction of the casing described later.

The fold line L2 is a boundary portion between a basal end portion 171 of the coupling portion 170 and the end portion 111 of the fuse element 100, and is parallel to the center line P.

As described above, the fuse element unit 101 including two fuse elements 100 is formed of one flat metal plate, and is configured such that the other end portions 112 of the fuse element 100 are directed in the same direction and each fuse element 100 is extended in the longitudinal direction of the casing by being bent at the coupling portion 170, so that manufacturing is easy, electrical connectivity between the fuse elements 100 is high, and the fuse element 100 is easily inserted into the casing and assembled. Each of the fuse elements 100 is integrally formed by being bent and formed from one flat metal plate, but this is not the sole case, and each of the fuse elements 100 may be individually manufactured, and the respective end portions 111 may be coupled by the coupling portion 170 manufactured as a separate body to obtain a state in which the two fuse elements 100 are coupled as illustrated in FIG. 2. The fuse element 100 is in a mode of including the first flat surface 140 and the second flat surface 150, but is not limited thereto, and may include the fusing portion 120 and may have an arbitrary shape as long as it has a long shape extending in the longitudinal direction of the casing.

Figure 3:
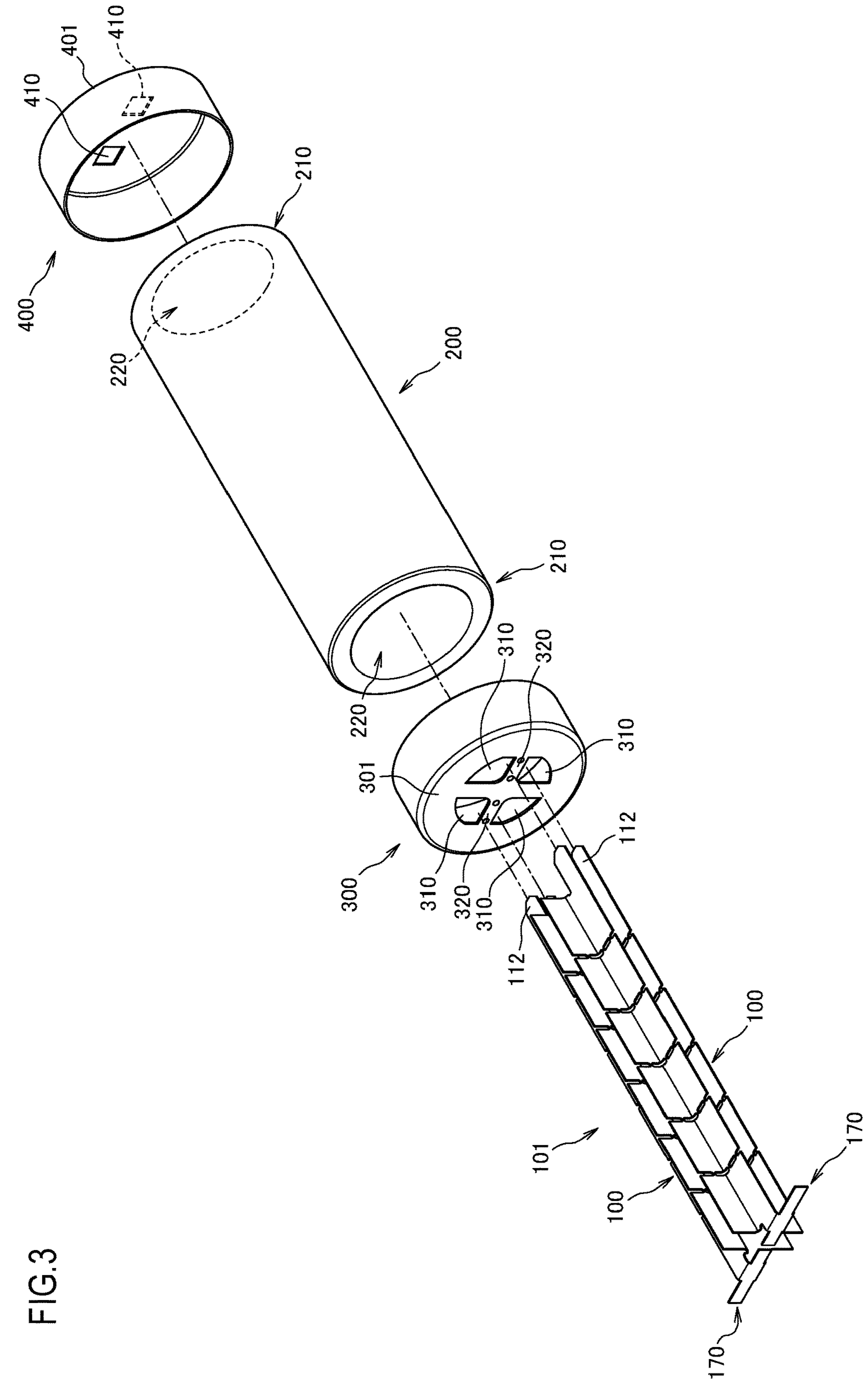
FIG. 3 is an exploded perspective view in the middle of assembling the fuse according to the first embodiment of the invention of the present application.

Next, a method for assembling the fuse of the invention of the present application will be described with reference to FIGS. 3 to 7. FIG. 3 is an exploded perspective view of the fuse in the middle of assembly.

As shown in FIG. 3, first, a first holding portion 300 is attached to one opening 220, and a second holding portion 400 is attached to the other opening 220 of an end portion 210 of the casing 200 laid on a horizontal plane. The casing 200 has a tubular shape formed of ceramic, synthetic resin, or the like, and has openings 220 at the end portions 210 on both sides. The casing 200 has a length capable of accommodating the fuse element 100 therein.

In addition, the first holding portion 300 is made of metal, and the top plate 301 has a flat substantially disk shape and is in the form of a cap so as to be able to be fitted to the end portion 210 of the casing 200. An insertion hole 310 through which the fuse element 100 of the fuse element unit 101 can be inserted is formed in the flat top plate 301 of the first holding portion 300, and a portion of the top plate 301 between the adjacent insertion holes 310 serves as a locking portion 320 that can lock the coupling portion 170 of the fuse element unit 101. The second holding portion 400 is made of metal, and the top plate 401 has a flat substantially disk shape and is in the form of a cap so as to be fitted to the end portion 210 of the casing 200. The flat top plate 401 of the second holding portion 400 has a put-in hole 410 through which the end portion 112 of the fuse element 100 of the fuse element unit 101 can be inserted.

Figure 4:
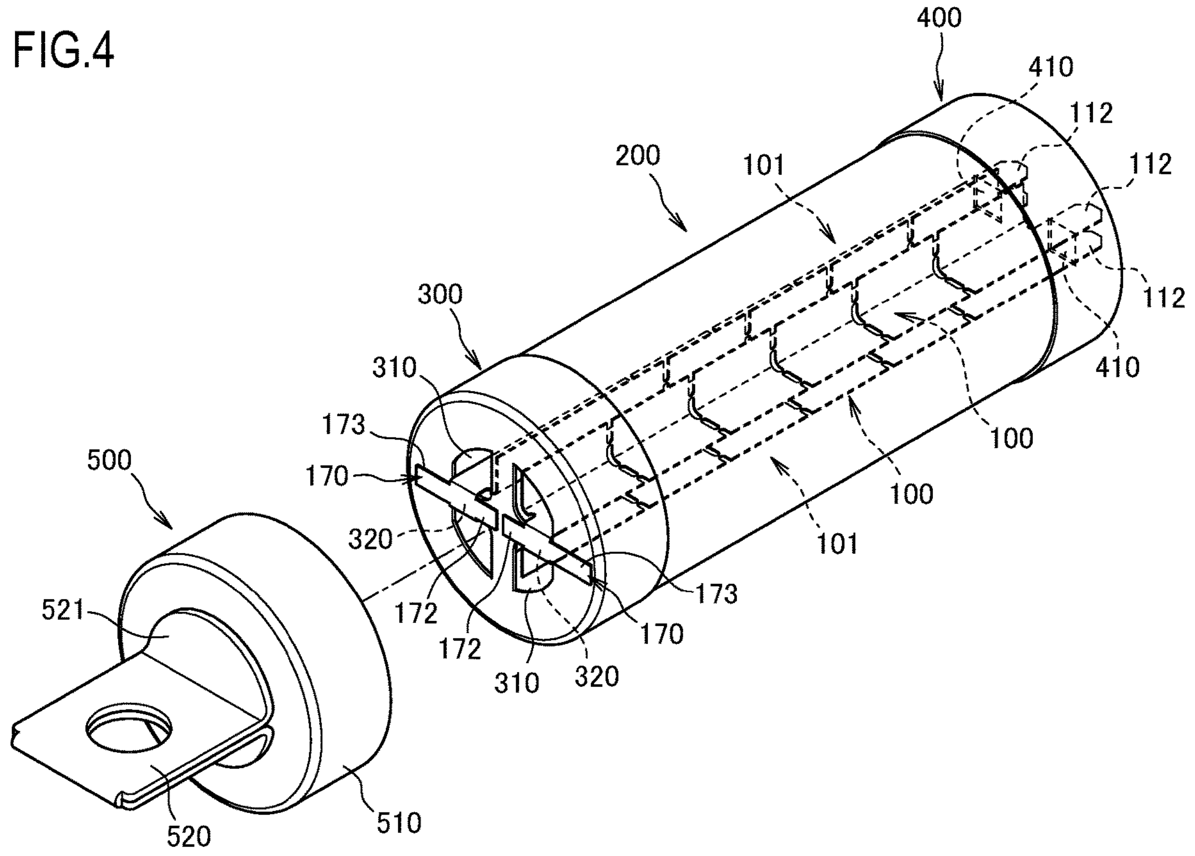
FIG. 4 is a perspective view of a state in which the fuse element is accommodated in a casing of the fuse according to the first embodiment of the invention of the present application.
Figure 5A:
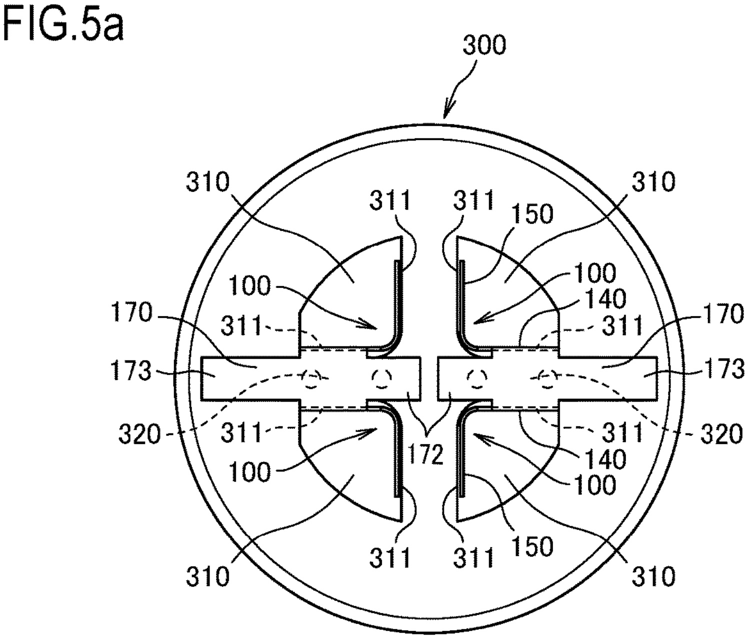
FIG. 5(*a*) is a front view of a state in which the fuse element is accommodated in the casing of the fuse according to the first embodiment of the invention of the present application, and FIG. 5(*b*) is a side view of the state.
Figure 5B:
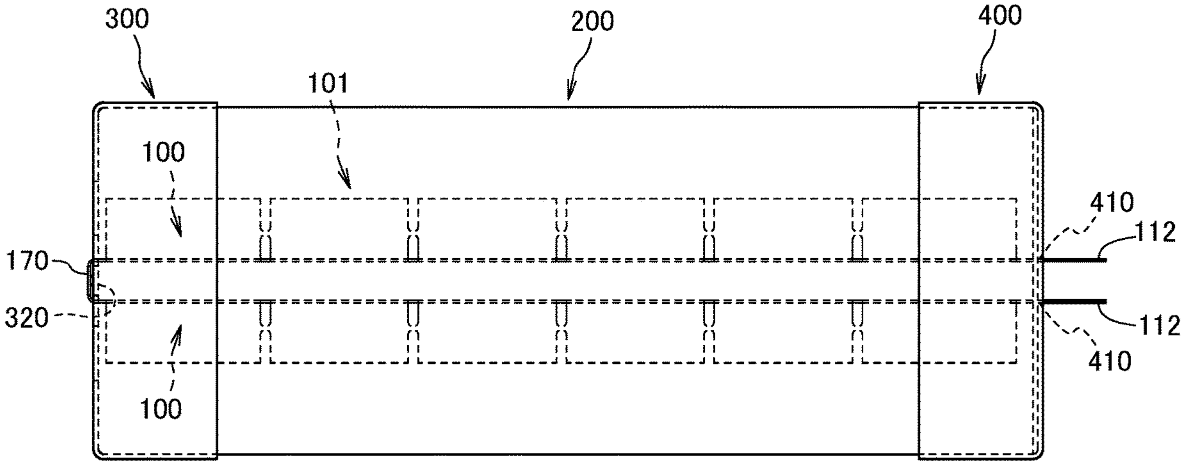

Then, the fuse element unit 101 is inserted into and accommodated in the casing 200 from the side of the one opening 220 of the casing 200 laid in a substantially horizontal state. Specifically, the end portion 112 side of each fuse element 100 of the fuse element unit 101 is inserted into each of the vertically adjacent insertion holes 310. Next, the fuse element 100 is inserted through the insertion hole 310 toward the inside of the casing 200 until the coupling portion 170 of the fuse element unit 101 abuts on and locks to the locking portion 320. Then, as illustrated in FIGS. 4 and 5, each of the fuse elements 100 of the fuse element unit 101 are accommodated in the casing 200. Two fuse element units 101 are arranged back-to-back, and each fuse element unit 101 is inserted from the corresponding insertion hole 310. Therefore, two fuse element units 101 are accommodated in the casing 200, and a total of four fuse elements 100 are accommodated. Since each fuse element 100 extends in the longitudinal direction of the casing 200, it can be easily inserted into and accommodated in the casing 200. FIG. 4 is a perspective view of a state in which the fuse element 100 is accommodated in the casing 200, FIG. 5(*a*) is a front view of a state in which the fuse element 100 is accommodated in the casing 200, and FIG. 5(*b*) is a side view of the state.

As shown in FIGS. 4 and 5, in a state where the fuse element 100 is accommodated in the casing 200, the coupling portion 170 is locked to the locking portion 320 of the first holding portion 300, so that the position and posture of each fuse element 100 in the casing 200 are less likely to displace and are stable. Therefore, when the fuse is assembled by attaching each component, the position and posture of each fuse element 100 in the casing 200 are stable, so that the fuse can be easily assembled. Furthermore, since the fuse can be assembled so that the position and posture of each fuse element 100 in the casing 200 do not displace, the performance of the fuse as designed can be easily realized.

The coupling portion 170 and the locking portion 320 may be fixed by welding in a state where the coupling portion 170 is locked to the locking portion 320 of the first holding portion 300. The first holding portion 300 is in the form of a cap, but is not limited thereto, and may be in any form as long as the fuse element 100 can be held by the locking portion 320. Furthermore, the first holding portion 300 is configured to include the insertion hole 310 and the locking portion 320 between the insertion holes 310, but is not limited thereto, and the first holding portion 300 may be of any other configuration as long as the first holding portion 300 includes the locking portion 320 that can be locked to the coupling portion 170.

Furthermore, the coupling portion 170 includes the extending portion 172 and the extending portion 173 on both sides, and the extending portion 172 and the extending portion 173 on both sides abut on and are locked to the locking portion 320 of the first holding portion 300, so that the position and posture of each fuse element 100 in the casing 200 are more unlikely to displace and are stable. Although the coupling portion 170 includes the extending portion 172 and the extending portion 173 on both sides, the present invention is not limited thereto, and the coupling portion 170 may not include the extending portion 172 and the extending portion 173 on both sides, or may include only one of the extending portion 172 and the extending portion 173. Even in the mode in which only one of the extending portion 172 and the extending portion 173 is provided, any one of the extending portion 172 and the extending portion 173 abuts on and is locked to the locking portion 320 of the first holding portion 300, so that an effect that the position and posture of each fuse element 100 in the casing 200 are less likely to displace and are stable can be obtained.

Since the first holding portion 300 includes the insertion hole 310 through which each fuse element 100 of the fuse element unit 101 is insertable, and the locking portion 320 is located between the insertion holes 310, as illustrated in FIGS. 4 and 5, the locking portion 320 is locked to the coupling portion 170 in a state of being sandwiched from both sides by the fuse elements 100 on both sides inserted into the insertion hole 310. Therefore, the substantially U-shaped portion can be locked to the locking portion 320 by the fuse elements 100 on both sides and the coupling portion 170, so that the position and posture of each fuse element 100 in the casing 200 are less likely to displace. In addition, in the process of inserting the fuse element 100 into the casing 200 as well, each of the fuse elements 100 of the fuse element unit 101 are inserted while sandwiching the locking portion 320 from both sides, so that the position and posture of each fuse element 100 are less likely to displace, and the fuse elements 100 can be easily inserted into the casing 200.

As shown in FIG. 5(*a*), the inner side 311 of the insertion hole 310 has a substantially L shape, and is formed to a shape that lies along the substantially L shape of the first flat surface 140 and the second flat surface 150 of the fuse element 100. Therefore, in the process of inserting the fuse element 100 into the casing 200, if the first flat surface 140 and the second flat surface 150 of the fuse element 100 are placed along the inner side 311 of the insertion hole 310, the position and posture of each fuse element 100 are less likely to displace, and the fuse element 100 can be easily inserted into the casing 200. Note that the inner side 311 of the insertion hole 310 has a substantially L-shape, but is not limited thereto, and may have any shape as long as the fuse element 100 can be inserted.

As shown in FIGS. 4 and 5, in a state where the fuse element 100 is accommodated in the casing 200, the other end portion 112 of the fuse element 100 is inserted into the put-in hole 410 of the second holding portion 400. Therefore, the position and posture of each fuse element 100 in the casing 200 are less likely to displace and are stable. The other end portion 112 of the fuse element 100 is put into the put-in hole 410 of the second holding portion 400, but this is not the sole case, and an arbitrary configuration may be adopted as long as the end portion 112 of the fuse element 100 can be electrically connected to a terminal portion 520 described later.

When the fuse element 100 is inserted into and accommodated in the casing 200 with the casing 200 laid in the substantially horizontal direction, the fuse element 100 may 100 tilt downward (vertical direction) due to its own weight. For this reason, in the conventional art, when a fuse is assembled by accommodating a long fuse element in a casing, a method of assembling a fuse by accommodating the fuse element in the casing in a state where the casing is standing in a substantially perpendicular direction has been adopted as described later. However, as shown in FIGS. 4 and 5, in the method for manufacturing a fuse according to the invention of the present application, since the coupling portion 170 is locked to the locking portion 320 of the first holding portion 300, the fuse element 100 is less likely to tilt downward (vertical direction) and the position and posture in the casing 200 are likely to stabilize, so that the fuse can be easily assembled. Thus, in the method for manufacturing a fuse according to the invention of the present application, the fuse can be assembled by stabilizing the position and posture of the fuse element 100 in the casing 200 even when the casing 200 is laid in the substantially horizontal direction, and thus the method for manufacturing the fuse can be diversified and convenience can be improved.

The fuse element 100 is inserted into and accommodated in the casing 200 in a state where the casing 200 is laid in a substantially horizontal direction, but this is not the sole case, and the fuse element 100 may be inserted into and accommodated in the casing 200 in a state where the casing 200 is standing in a substantially perpendicular direction (substantially vertical direction) as in the conventional case. In this case, the fuse element 100 is inserted from above the one opening 220 with the casing 200 standing in a substantially perpendicular direction. Next, the fuse element 100 is inserted through the insertion hole 310 toward the inside of the casing 200 until the coupling portion 170 abuts on and locks to the locking portion 320 of the first holding portion 300, so that the fuse element 100 is accommodated in the casing 200. Since the coupling portion 170 is locked to the locking portion 320 of the first holding portion 300, the position and posture of each fuse element 100 in the casing 200 are less likely to displace and are stable.

Next, as shown in FIG. 4, after the fuse element 100 is accommodated in the casing 200, the cap 500 with a terminal is placed and attached to the first holding portion 300. The cap 500 with a terminal includes a main body portion 510 made of metal or synthetic resin, and a terminal portion 520 made of metal protruding from the main body portion 510. The back surface of the base portion 521 of the terminal portion 520 is a flat surface, and when the cap 500 with a terminal is attached to the first holding portion 300, the back surface of the base portion 521 is brought into close contact with the coupling portion 170 of the fuse element 100. Therefore, the terminal portion 520 and the fuse element 100 are electrically connected through the coupling portion 170.

Figure 6A:
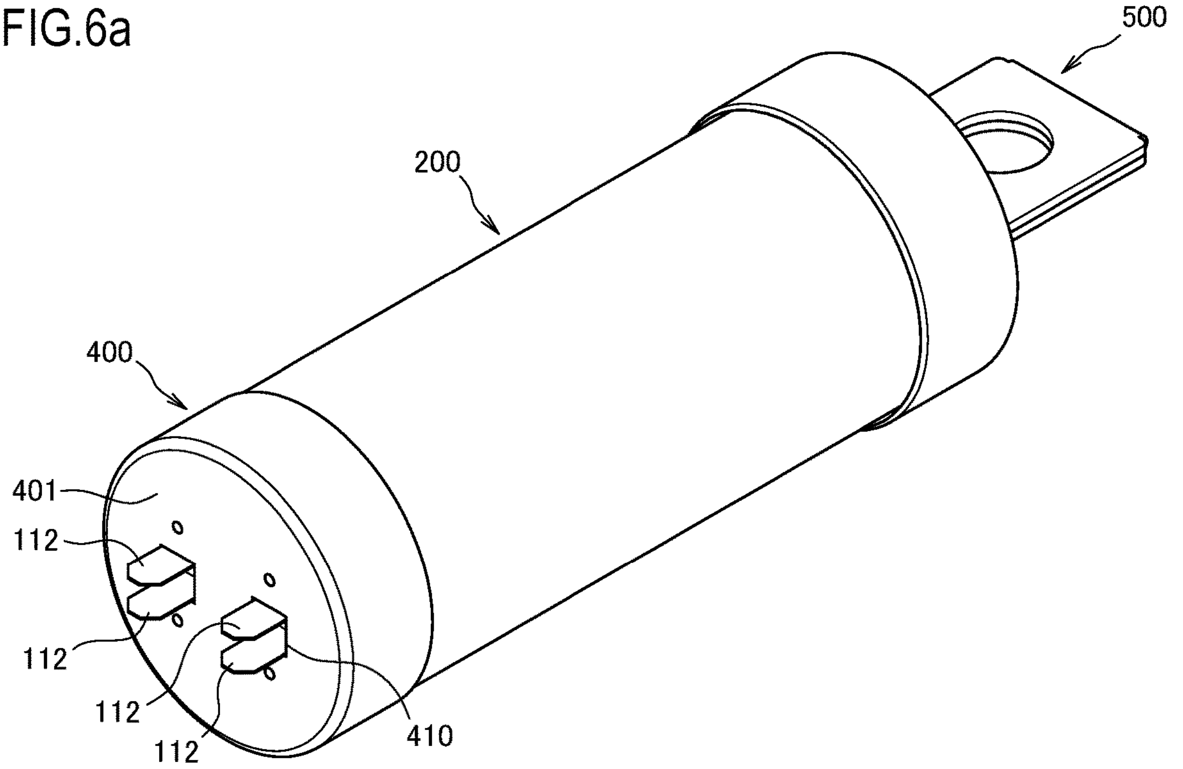
FIGS. 6(*a*) and 6(*b*) are perspective views of a state in which the fuse element is accommodated in the casing of the fuse according to the first embodiment of the invention of the present application.
Figure 6B:
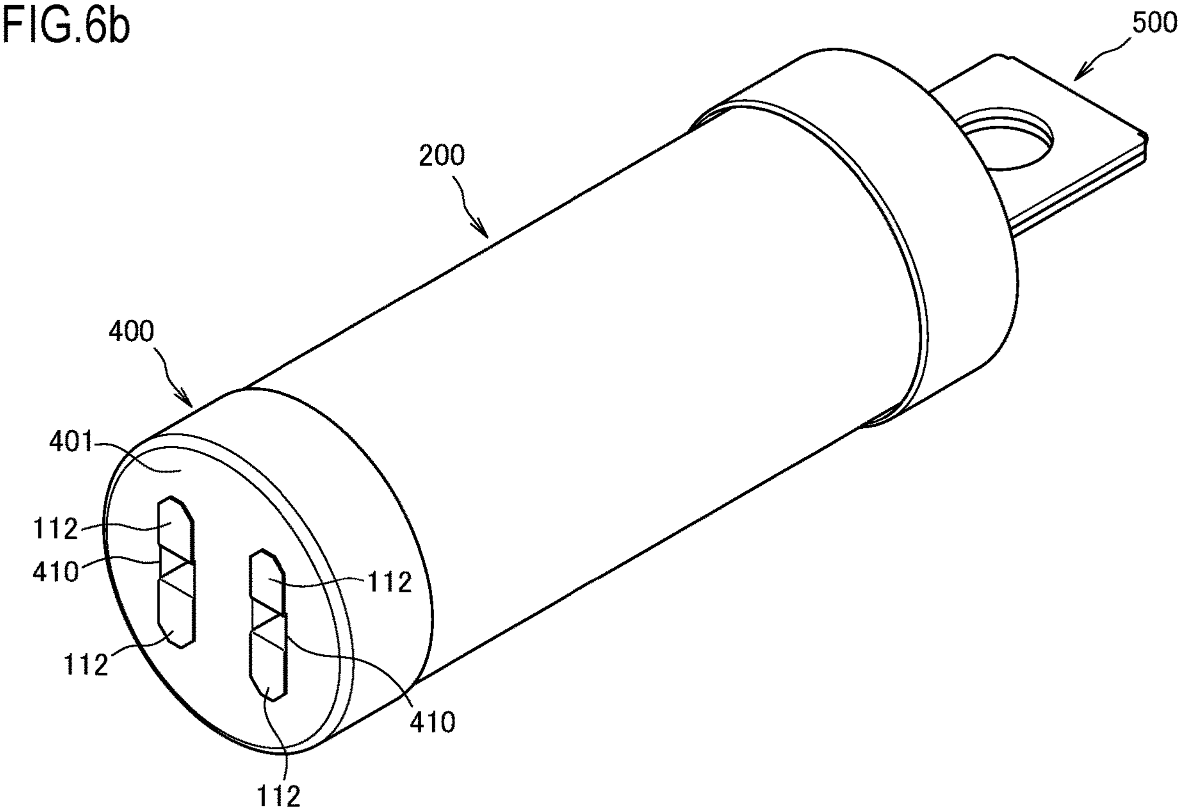

Next, as shown in FIG. 6, each end portion 112 of the fuse element 100 protruding from the put-in hole 410 of the second holding portion 400 is bent. An arbitrary arc-extinguishing material such as particles is filled inside the casing 200 from the put-in hole 410. FIGS. 6(*a*) and 6(*b*) are perspective views of a state in which the fuse element 100 is accommodated in the casing 200.

Figure 7A:
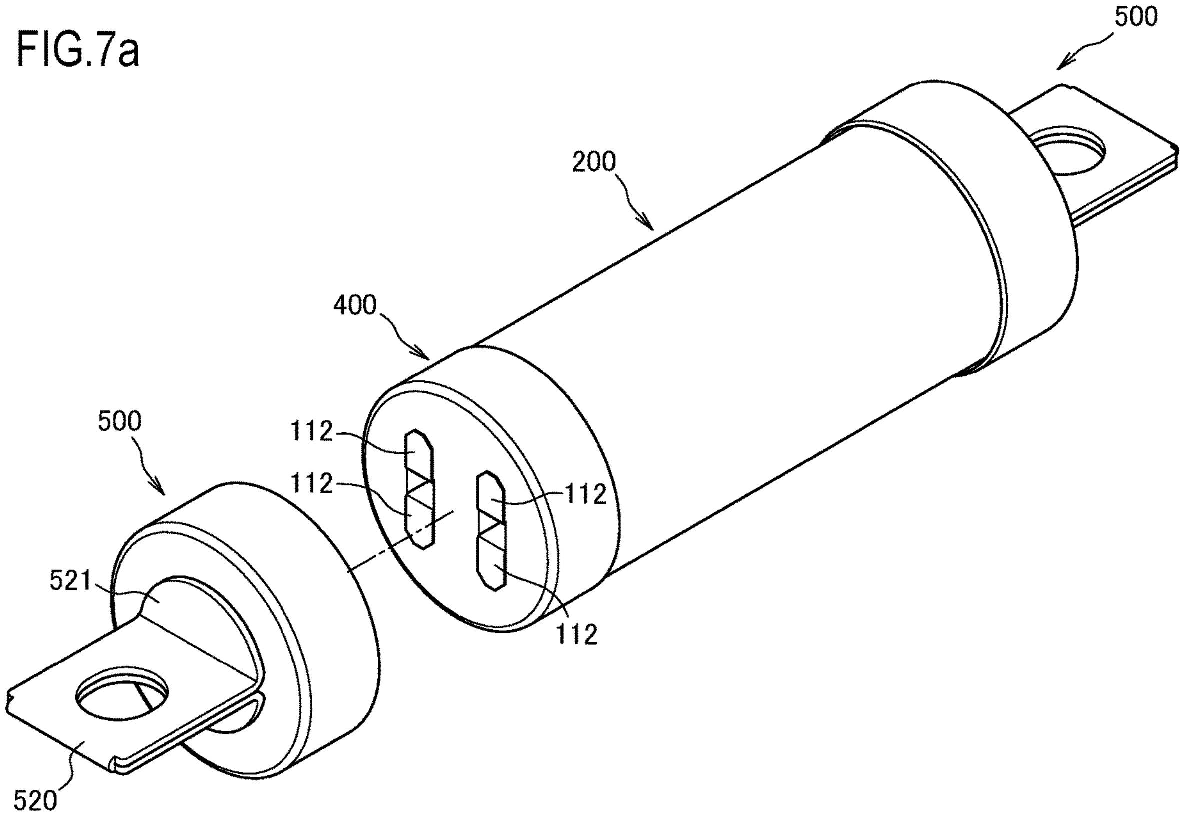
FIGS. 7(*a*) and 7(*b*) are perspective views of a state in which the fuse element is accommodated in the casing of the fuse according to the first embodiment of the invention of the present application.
Figure 7B:
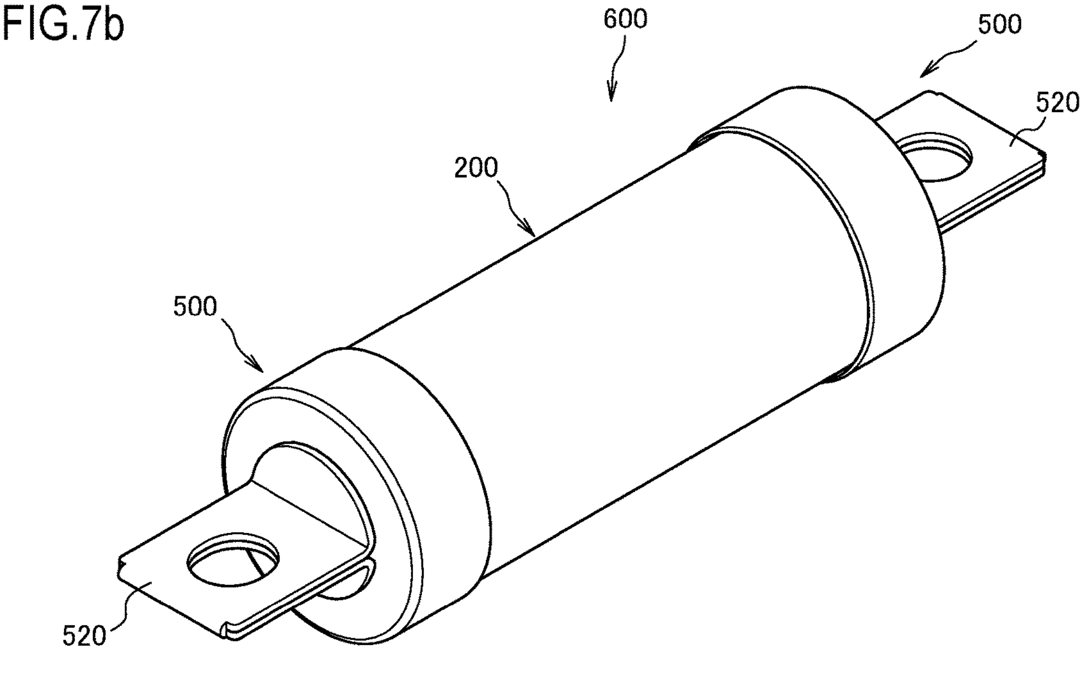

As shown in FIG. 6(*b*), the end portion 112 of the fuse element 100 is bent to bring the end portion 112 into close contact with the top plate 401 around the put-in hole 410. A close contact portion between the end portion 112 and the top plate 401 may be welded and fixed. Furthermore, as shown in FIG. 7, the cap 500 with a terminal is placed and attached to the second holding portion 400. FIGS. 7(*a*) and 7(*b*) are perspective views of a state in which the fuse element 100 is accommodated in the casing 200.

When the cap 500 with a terminal is attached to the second holding portion 400, the back surface of the base portion 521 is brought into close contact with the end portion 112 of the fuse element 100. Therefore, the terminal portion 520 and the fuse element 100 are electrically connected through the end portion 112. The assembly of the fuse 600 of the invention of the present application is thereby completed. As described above, in a series of assembly works of the fuse 600 according to the invention of the present application, since the coupling portion 170 is locked to the locking portion 320 of the first holding portion 300, the position and posture of each fuse element 100 in the casing 200 are less likely to displace and are stable, so that assembling of the fuse 600 is easy. The fuse 600 is used such that when a part of the electric circuit is electrically connected to the terminal portions 520 on both sides protruding from the cap 500 with a terminal, and an unintended overcurrent flows in the electric circuit, the fusing portion 120 of the fuse element 100 accommodated in the casing 200 fuses to cut off the overcurrent, thereby protecting the electric circuit.

Second Embodiment

Hereinafter, a fuse according to a second embodiment of the invention of the present application will be described with reference to FIGS. 8 and 9. This fuse is different from the fuse element unit 101 of the fuse 600 according to the first embodiment only in the configuration of a fuse element unit 101A, and the other configurations are basically common with those of the fuse 600 according to the first embodiment, and hence detailed description of the common configurations is omitted.

Figure 8A:
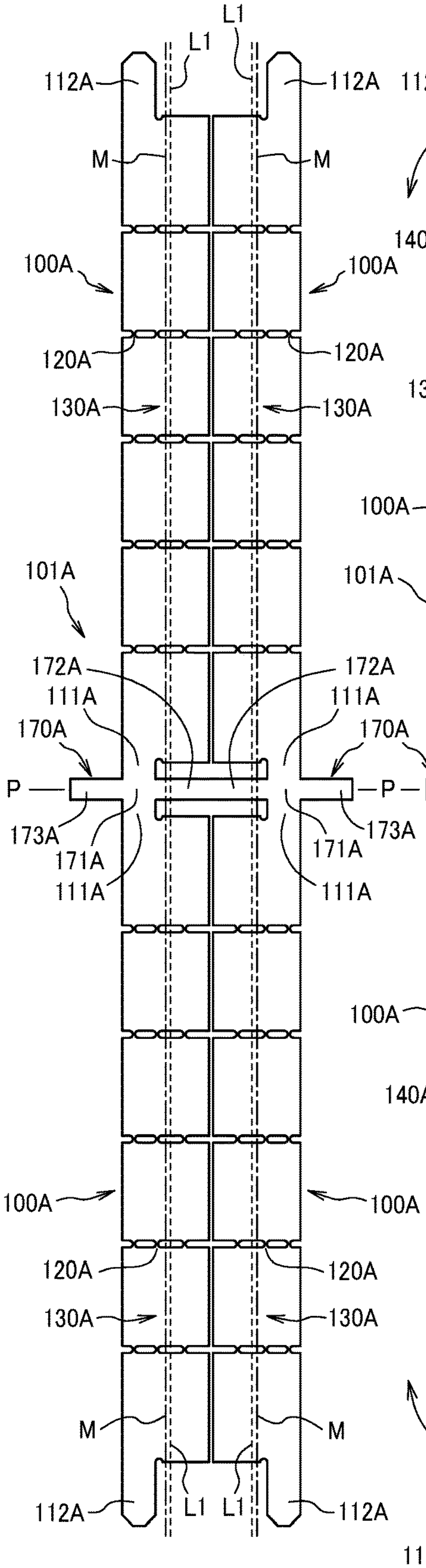
FIG. 8(*a*) is a plan view of a state in which a fuse element unit of a fuse according to a second embodiment of the invention of the present application is developed, FIG. 8(*b*) is a plan view of a state in which the fuse element unit is bent and molded, and FIG. 8(*c*) is a front view of a state in which the fuse element unit is bent and molded.
Figure 8B:
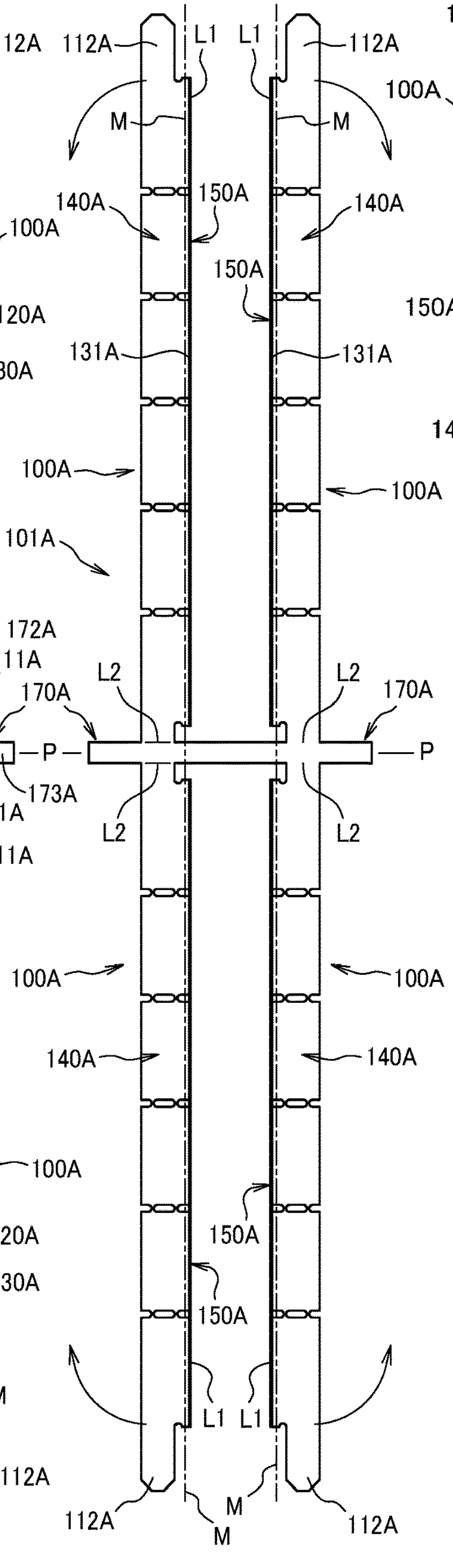
Figure 8C:
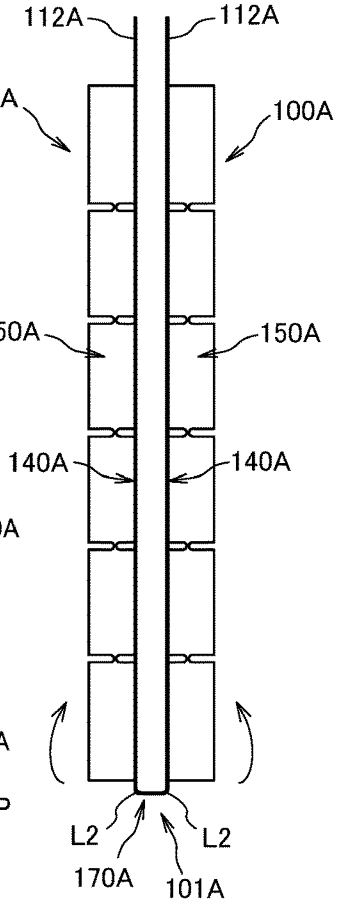
Figure 9:
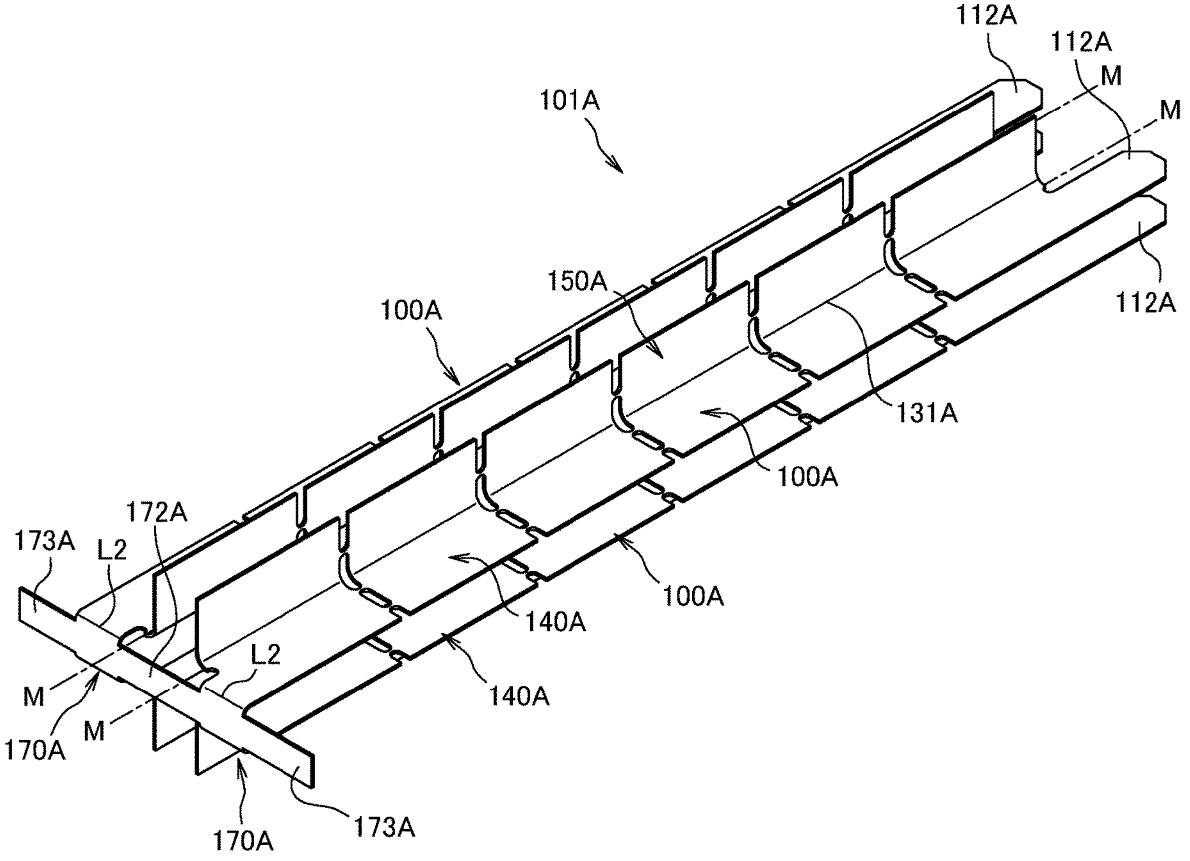
FIG. 9 is a perspective view of a bent and molded fuse element unit.

FIG. 8(*a*) is a plan view of a state in which the fuse element unit 101A is developed, FIG. 8(*b*) is a plan view of a state in which the fuse element unit 101A is bent and molded, and FIG. 8(*c*) is a front view of a state in which the fuse element unit 101A is bent and molded, and FIG. 9 is a perspective view of the bent and molded fuse element unit 101A.

First, when the fuse element unit 101A is bent and molded, a flat plate material having a uniform thickness made of a conductive metal such as copper or an alloy thereof is punched into a shape as illustrated in FIG. 8(*a*) by a press machine or the like. One metal plate shaped into a predetermined shape as illustrated in FIG. 8(*a*) is provided with a total of four of a pair of fuse elements 100A that are line symmetric to a center line P. Each fuse element 100A has a long shape in which one end portion 111A and the other end portion 112A, an intermediate portion 130A between the end portion 111A and the end portion 112A on both sides, and a plurality of fusing portions 120A are formed.

One end portions 111A of the pair of fuse elements 100A are coupled to each other by a coupling portion 170A. The coupling portion 170A has a flat plate shape, and includes a basal end portion 171A continuing with the end portion 111A, an extending portion 172A extending from the basal end portion 171A toward one side, and an extending portion 173A extending from the basal end portion 171A toward the other side. Furthermore, since the adjacent extending portions 172A are coupled to each other, the adjacent coupling portions 170A have a linear flat plate shape as a whole.

Next, as shown in FIGS. 8(*a*) and 8(*b*), the intermediate portion 130A is bent at a fold line L1 parallel to the long length direction M of the fuse element 100A. Then, the intermediate portion 130A includes a first flat surface 140A linearly extending along the long length direction M and a second flat surface 150A bent so as to rise from the first flat surface 140A and linearly extending along the long length direction M. The first flat surface 140 and the second flat surface 150 are continuous with each other at a bent portion 131A bent at the fold line L1, and the first flat surface 140A and the second flat surface 150A intersect each other at a substantially right angle.

Furthermore, as illustrated in FIGS. 8(*c*) and 9, each fuse element 100A is bent so as to rise approximately 90 degrees at a fold line L2. Then, the fuse elements 100A are brought proximate to each other to a parallel state. Then, the fuse element unit 101A including four fuse elements 100A in which the other end portions 112A side are directed in the same direction is completed.

As described above, the fuse element unit 101A including four fuse elements 100A is formed of one flat metal plate, and is configured such that the other end portions 112A of the fuse element 100A are directed in the same direction and each fuse element 100A is extended in the longitudinal direction of the casing by being bent at the coupling portion 170A, so that manufacturing is easy, electrical connectivity between the fuse elements 100A is high, and the fuse element 100A is easily inserted into the casing and assembled. Each of the fuse elements 100A is integrally formed by being bent and formed from one flat metal plate, but this is not the sole case, and each of the fuse elements 100A may be individually manufactured, and the respective end portions 111A may be coupled by the coupling portion 170A manufactured as a separate body to obtain a state in which the four fuse elements 100A are coupled as illustrated in FIG. 9. Furthermore, the fuse element unit 101A includes a total of four fuse elements 100A, but is not limited thereto, and can include at least two or more fuse elements 100A, such as a total of three fuse elements 100A or a total of five or more fuse elements 100A.

Then, the fuse element unit 101A is inserted into and accommodated in the casing 200 from the side of the one opening 220 of the casing 200 laid in a substantially horizontal state, similar to FIG. 3. Specifically, the end portion 112A side of each fuse element 100A of the fuse element unit 101A is inserted into each of the vertically adjacent insertion holes 310. Next, the fuse element 100A is inserted through the insertion hole 310 toward the inside of the casing 200 until the coupling portion 170A of the fuse element unit 101A abuts on and locks to the locking portion 320 of the first holding portion 300, so that each fuse element 100A of the fuse element unit 101A is accommodated in the casing 200. In a state where the fuse element 100A is accommodated in the casing 200, the coupling portion 170A is locked to the locking portion 320 of the first holding portion 300, so that the position and posture of each fuse element 100A in the casing 200 are less likely to displace and are stable, and the fuse can be easily assembled.

The fuse and the method for manufacturing the fuse of the invention of the present application are not limited to the above embodiments, and various modifications and combinations are possible within the scope of the claims and the scope of the embodiments, and such modifications and combinations are also included in the scope of the right.

While the preferred embodiment of the invention has been illustrated and described, as noted above, many changes can be made without departing from the spirit and scope of the invention. Accordingly, the scope of the invention is not limited by the disclosure of the preferred embodiment. Instead, the invention should be determined entirely by reference to the claims that follow.

The invention claimed is:

1. A fuse comprising:
a plurality of fuse elements having a fusing portion; and
a casing accommodating the fusing portion; wherein
each of the plurality of fuse elements has a long shape extending in a longitudinal direction of the casing;
each of the plurality of fuse elements has a first end portion side coupled to each other by a coupling portion;
a first holding portion that holds each of the plurality of fuse elements is provided in a first opening of the casing;
a locking portion that locks the coupling portion is provided in the first holding portion;
the first holding portion includes a plurality of insertion holes through which each of the plurality of fuse elements is insertable into the casing; and
the locking portion is located between the insertion holes.

2. The fuse according to claim 1, wherein
a second holding portion that holds each of the plurality of fuse elements is provided in a second opening of the casing, and
the second holding portion includes a put-in hole into which the other end portion side of each of the plurality of fuse elements is put in.

3. The fuse according to claim 1, wherein
each of the plurality of fuse elements is bent and formed from one flat metal plate, and
a second end portion side of each of the plurality of fuse elements is directed in the same direction and each of the plurality of fuse elements is extended in the longitudinal direction of the casing by being bent at the coupling portion.

4. A method for manufacturing a fuse, wherein the fuse comprises a plurality of fuse elements having a fusing portion, a casing accommodating the fusing portion, and a first holding portion, the method comprising the steps of:

inserting each of the plurality of fuse elements into the casing from a side of one opening of the casing in a state where the casing is laid in a substantially horizontal direction;

locking a coupling portion of each of the plurality of fuse elements to a locking portion of the first holding portion;

accommodating each of the plurality of fuse elements in the casing;

the first holding portion includes a plurality of insertion holes through which each of the plurality of fuse elements is insertable into the casing; and the locking portion is located between the insertion holes.

5. The fuse according to claim 1, wherein a second holding portion that holds each of the plurality of fuse elements is provided in the other opening of the casing, and the second holding portion includes a put-in hole into which the other end portion side of each of the plurality of fuse elements is put in.

6. The fuse according to claim 1, wherein each of the plurality of fuse elements is bent and formed from one flat metal plate, and the other end portion side of each of the plurality of fuse elements is directed in the same direction and each of the plurality of fuse elements is extended in the longitudinal direction of the casing by being bent at the coupling portion.

7. The fuse according to claim 2, wherein each of the plurality of fuse elements is bent and formed from one flat metal plate, and the other end portion side of each of the plurality of fuse elements is directed in the same direction and each of the plurality of fuse elements is extended in the longitudinal direction of the casing by being bent at the coupling portion.

8. The method according to claim 5, wherein a second holding portion that holds each of the plurality of fuse elements is provided in a second opening of the casing, and the second holding portion includes a put-in hole into which the other end portion side of each of the plurality of fuse elements is put in.

9. The method according to claim 4, wherein each of the plurality of fuse elements is bent and formed from one flat metal plate, and a second end portion side of each of the plurality of fuse elements is directed in the same direction and each of the plurality of fuse elements is extended in the longitudinal direction of the casing by being bent at the coupling portion.

* * * * *